US Patent [19] 4,104,362
Hahn et al.  [45] Aug. 1, 1978

[54] PROCESS FOR THE MANUFACTURE OF AMMONIUM POLYPHOSPHATE

[75] Inventors: Heinrich Hahn, Gladbeck; Hans Heumann, Herne; Heinz Liebing, Wanne-Eickel; Manfred Schweppe; Walter Hilt, both of Herne, all of Fed. Rep. of Germany

[73] Assignee: Veba-Chemie Aktiengesellschaft, Gelsenkirchen-Buer, Fed. Rep. of Germany

[21] Appl. No.: 669,416

[22] Filed: Mar. 22, 1976

Related U.S. Application Data

[63] Continuation of Ser. No. 429,311, Dec. 28, 1973, abandoned.

[30] Foreign Application Priority Data

Dec. 30, 1972 [DE] Fed. Rep. of Germany ....... 2264306

[51] Int. Cl.² .................... C01B 15/16; C01B 25/26
[52] U.S. Cl. ................................ 423/315; 423/313; 423/310; 71/43
[58] Field of Search .............. 423/313, 305, 307–312, 423/315; 71/43; 23/283

[56]  References Cited

U.S. PATENT DOCUMENTS

| | | | |
|---|---|---|---|
| 2,950,180 | 8/1960 | Kunzer et al. | 23/283 |
| 3,395,990 | 8/1968 | Ballestia | 23/283 |
| 3,397,036 | 8/1968 | Narins et al. | 423/305 |
| 3,503,706 | 3/1970 | Legal | 423/305 |
| 3,723,086 | 3/1973 | Poynor et al. | 423/313 |
| 3,730,700 | 5/1973 | Groenveld | 423/310 |

OTHER PUBLICATIONS

Brauer, VDI – Forschungsheft No. 457.
Smegal et al., *Seife, Ole, Fette, Wachse* 27, (1971), No. 20, 703–708.

*Primary Examiner*—Earl C. Thomas
*Assistant Examiner*—Gregory A. Heller
*Attorney, Agent, or Firm*—Burgess, Dinklage & Sprung

[57]  ABSTRACT

Ammonium polyphosphate is manufactured on a continuous basis by reacting gaseous ammonia and aqueous phosphoric acid at elevated temperatures in a one or multiple stage falling film reaction zone in the presence of a diluting gas if desired, using wet phosphoric acid, preferably containing 28–32%, by weight $P_2O_5$ and an excess of ammonia. The phosphoric acid and the gaseous ammonia are preferably carried in counterflow and the temperature in the falling film reaction zone is adjusted using heat transfer fluids to within the range of 120° – 260° C.

10 Claims, 1 Drawing Figure

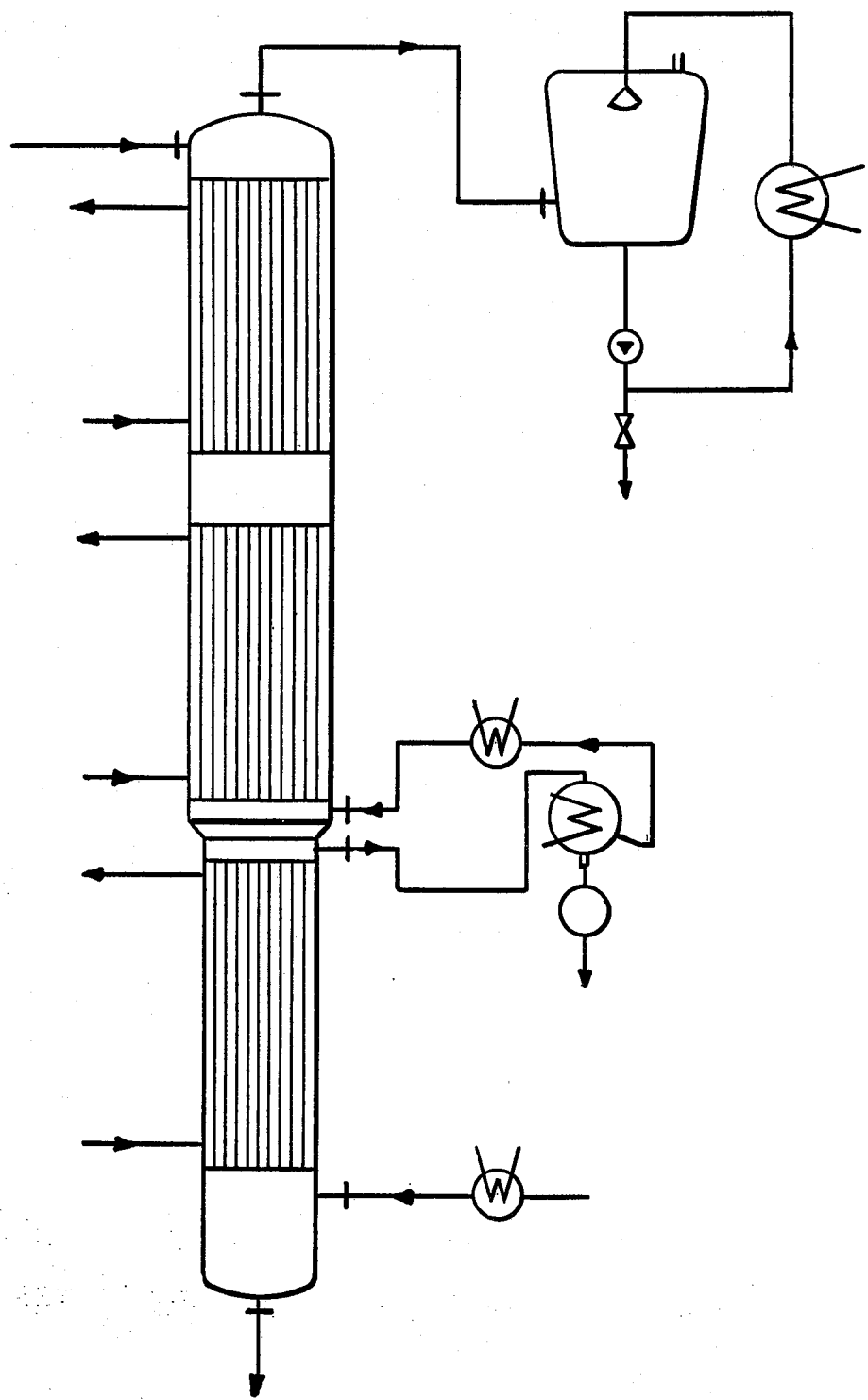

PROCESS FOR THE MANUFACTURE OF AMMONIUM POLYPHOSPHATE

This is a continuation of application Ser. No. 429,311, filed Dec. 28, 1973, now abandoned.

BACKGROUND

The invention relates to a process for the manufacture of ammonium polyphosphate from gaseous ammonia and aqueous phosphoric acid, preferably in the unpurified state and with a concentration of the order of 28% $P_2O_5$, through the use of a multiple-stage falling film reactor whose individual stages are kept by means of suitable heating fluids at temperatures adapted to the desired degree of condensation, the preheated ammonia flowing against the phosphoric acid descending in a film within the fall tubes.

Between the individual stages the vaporous water being released by the concentration and by chemical reaction can be separated by intermediate condensation, while the gaseous ammonia (together with a diluting gas in some cases) is fed to the next stage of the falling film reactor after reheating to the particular reaction temperature. The liquids, generally containing ammonium fluoride, which finally emerge from the reactor, are precipitated in an injection condenser.

Ammonium polyphosphate has been gaining in importance as a fertilizer (in solid or dissolved form) and as an additive to detergents, or for use as a flameproofing agent and for other purposes.

The manufacture of this product starts out either from superphosphoric acid and ammonia, or from highly concentrated phosphoric acid containing at least 50 wt-% $P_2O_5$ and ammonia. In other processes, ammonium phosphate is concentrated by evaporation in the presence of urea. It is also possible to burn phosphorus in the presence of ammonia or to melt ammonium phosphate together with $P_2O_5$.

Dilute phosphoric acid solutions or dilute ammonium phosphate solutions are generally first concentrated by more or less tedious processes, usually multi-step processes, before they are delivered to the apparatus in which the actual manufacture of the polyphosphate is to take place. On account of the great amount of corrosive effects which are usually produced during these processes, they are performed at the lowest possible temperatures and therefore usually at reduced pressure.

SUMMARY

It has now been found that ammonium polyphosphate may be produced continuously without substantial corrosion in a single apparatus and without the use of a vacuum by performing the reaction in a single or multiple stage falling film reaction zone, in the presence of a diluting gas if desired, using wet phosphoric acid, preferably containing 28 to 32 wt-% $P_2O_5$, and an excess of ammonia.

DESCRIPTION OF THE DRAWINGS

The accompanying drawing is a diagrammatic view in vertical elevation showing a falling film reaction column that can be utilized in carrying out the process of the invention.

DESCRIPTION

For the polycondensation of phosphorus pentoxide in aqueous phosphoric acid solutions or phosphate solutions to form superphosphoric acid or polyphosphates, it is necessary to put in heat, e.g., by heating to temperatures above 100° C. Steam has generally been used for this purpose hitherto, i.e., the exchanger tubes involved must be able to withstand the corresponding pressure.

This requirement is unnecessary when appropriate fluid media are used in accordance with the invention. The heat transfer liquids may be high-boiling, aromatic or non-aromatic, inert hydrocarbons, such as silicon oils or other commercial thermal oils.

In the process of the invention, the neutralization of the phosphoric acid by gaseous ammonia is simultaneously accompanied by a concentration of the salt solution that forms, plus the polycondensation of the phosphate that is present to polyphosphate. The polycondensation which generally occurs only upon the addition of heat superimposes itself upon the neutralization and wholly or partially consumes the neutralization heat that is released, so that particularly good use is made of the latter in the closed system.

The falling film reactor used in accordance with the invention consists of one or more stages or having in some cases separate circuits for the thermal oil used as the heat transfer medium. By establishing different temperatures in the individual stages or zones of the falling film reaction zone, it is possible to favor concentration by the evaporation of water or at higher temperatures, to favor condensation to polyacids.

In general, the heat transfer oil is to be introduced into the individual stages of the falling film reactor at temperatures between 120° and 260° C.

Through various temperatures of the heat transfer oils in the individual stages and especially through the selection of the temperatures involved, the condensation ratio of the final product may be controlled to a great extent. In general, the lowermost stage will be operated at the highest temperature that is used.

In most cases, operation at normal pressure is to be preferred to a procedure at a pressure above or below normal in the application of the process of the invention.

Suitable reactors forming falling film reaction zones are described, for example, by H. Brauer, *VDI-Forschungsheft* No. 457, and H. Smegal and H. Liebing, "Dimensionierung von Fallfilmverdampfern" in *Seife, Ole, Fette, Wachse* 97 (1971) No. 20, 703–08.

It is desirable not to transport the water vapor released by evaporation, neutralization and polycondensation through the entire falling film reaction zone, but to remove it, even prior thereto in some cases. For this purpose circuits are to be provided in the gas phase between the individual stages, in which the water will be largely separated by known methods. Before the reaction gas thus freed of water vapor is returned to the column, it is to be heated again to the working temperature. The heating is performed advantageously in a heat exchanger using heat transfer oil from one stage of the falling film reaction zone for the transfer of the heat.

Since the heat of neutralization is entirely utilized in the system for the polycondensation of $P_2O_5$, it is generally necessary during the operation of the falling film reactor only to reheat the heat transfer oil circuits slightly. This reheating, as well as the heating performed at the start, is performed by known methods, preferably in heat exchangers, using flue gases for example.

The ammonia that is to be used (as well as the diluting gas, if any) is heated prior to entry into the reaction tubes, generally to temperatures between 150° and 250° C. This heating is likewise performed by heat exchangers fed with heat transfer oil.

The gaseous ammonia flows through the falling film tubes, in which phosphoric acid trickles downward along the tube walls, enabling the ammonia to react with the acid.

So much ammonia is always put in that an excess exists over the intended molar ratio of $P_2O_5$ to $NH_3$. In the case of raw acids having very high contents of acid secondary constituents, an even greater excess of $NH_3$ over $P_2O_5$ will be used. Following this practice leaves sufficient amounts of $NH_3$ in the gas phase to assure the removal of the volatile impurities in the phosphoric acid being used.

The vapors emerging at the head of the falling film reactor contain, in addition to the diluting gas, varying amounts of ammonia, ammonium fluoride, fluorine compounds, water vapor and other compounds. This gas mixture must be freed of the fluorine compounds in an intensive separator. An injection condenser, into which dilute soda lye is injected, has proven particularly valuable for this purpose. The ammonia that is thus released is reprecipitated in an acid post-separator. The residual vapors are virtually free of fluorine compounds and ammonia and may be emitted without polluting the atmosphere.

The crude phosphoric acid is fed into the top of the falling film reactor and flows down the tubes and through separators from one stage to the next, while they are neutralized and transformed to ammonium phosphate and ammonium polyphosphate.

In general, a virtually water-free molten mass will be obtained in the lowermost stage, and will finally drip into the sump of the falling film reactor and may be taken continually or in batches from then for further processing.

Depending on the ratio of $NH_3:P_2O_5$, and depending on the degree of condensation achieved, condensation products of varying composition will be obtained. Thus, in the case of the simplest polyphosphate, pyrophosphate, mixtures between the adjacent compounds $(NH_4)_4P_2O_7$ and $NH_4H_3P_2O_7$ are possible (solutions containing smaller amounts of free acid or even solutions containing free $NH_3$ are, of course, also producible). In the compounds mentioned, the $NH_3:P_2O_5$ molar ratio is between 4:1 and 1:1, while in the three orthophosphates it varies between 6:1 and 2:1. As the degree of condensation increases the maximum number of $NH_3$ moles that can be introduced per mole of $P_2O_5$ diminishes; thus in the case of $(NH_4)_5P_3O_{10}$ it amounts to 3.33, in the case of $(NH_4)_6P_4O_{13}$ it is 3.0, and in the case of $(NH_4)_{10}P_8O_{25}$ it is only 2.5.

In all these cases, however, acid salts are also possible, so that the $NH_3:P_2O_5$ molar ratio may be between 0 and the maximum figures given. For the manufacture of a pure ammonium salt of polyphosphoric acids, at least 0.5 mole of $NH_3$ will be used in practice per mole of $P_2O_5$, but for the manufacture of solutions of mixed polyphosphate solutions, fewer moles of $NH_3$ will occasionally be used per mole of $P_2O_5$.

As the experiments performed with apparatus made in accordance with the invention have shown, it is possible by varying the temperature in the individual stages, by varying the acid and ammonia inputs and by controlling the $NH_3:P_2O_5$ ratio, to vary the composition of the products within the range discussed above, preferably between 4.5 and 0.5.

In general, the dimensions of the apparatus will be optimally adapted to the raw acid to which preference is given. In the case of apparatus already on hand, however, a broad choice is still available in the composition of the products, as the above-mentioned experiments have shown.

Products corresponding to the regular commercial ammonium polyphosphates containing 12 to 16 wt-% $NH_4$-N and 54 to 70 wt-% $P_2O_5$ (corresponding to an $NH_3:P_2O_5$ molar ratio of 1.75 to 3.00) may be made with reactors constructed in accordance with the invention, generally without difficulty. Preferably, the conditions of production are established so that products containing 14 ± 2 wt-% N and 60 ± 3 wt-% $P_2O_5$ (corresponding to an $NH_3:P_2O_5$ molar ratio of 2.4 to 2.84) will be formed. In a product of this kind a pH can be determined (after dilution to a solution of 10% by weight) of 4.3 to 5.2. In other compositions pH values between 2.5 and 6 have been observed. The content of polyphosphoric acid in the total phosphoric acid was, in the products produced, between 25 and 85%.

Furthermore, it is possible to add also to the phosphoric acid solutions of compounds which promote polycondensation, such as urea for example.

The phosphoric acid to be used may be in virtually any concentration. In raw acids a $P_2O_5$ content of 28 to 30% is preferred. If more concentrated or more diluted solutions are used, the conditions of the process are to be adapted accordingly.

The amount and nature of the (commonly occurring) impurities in the phosphoric acid present no difficulty in the process of the invention. One need only see to it that an excess of $NH_3$ above the acid volatile secondary constituents of the raw acid is maintained. Since the virtually corrosion-free removal of such compounds is one of the advantages of the process of the invention, it will be used preferentially for impure raw acids, e.g., for phosphoric acids from raw phosphates having a high fluorine content, or for those which are obtained by treatment with HCl.

Acid-resistant steel has generally proven to be a practical material for the falling film reactor, the section condensers and the heat exchangers. For critical parts of the apparatus materials are recommended which are resistant also to fluorine compounds.

The gaseous ammonia may be fed into the column either alone or together with a "carrier gas." All inert gases are usable as diluting gases, e.g., air or nitrogen. Particularly when acids containing more than 40 wt-% $P_2O_5$ are used it is recommended that the process be performed with the use of an inert gas. If a diluting gas is used, explosive mixtures with ammonia are of course to be avoided, i.e., in the case of air, for example, mixtures containing more than 13% ammonia by volume.

EXAMPLES

The acid used in the examples had the following composition:

| | |
|---|---|
| $P_2O_5$ | 28 – 30%, by weight |
| F | 1.5 – 2.0% by weight |
| CaO | 0.2 – 0.4% by weight |
| $SO_3$ | 2.0 – 3.0% by weight |
| $Al_2O_3/Fe_2O_3$ | 0.2 – 0.4% by weight |

The amount of solids in the raw acid usually amounted to from 3 to 5 g/l. These were mainly:

| | |
|---|---|
| CaO | 16% |
| F | 21% |
| $SO_3$ | 24% |
| $SiO_2$ | 35% |

In the experiments, a two-stage falling film reactor of glass was used with an inside diameter of 4 cm and an effective length of 0.8 m in each stage. Ammonia was used without diluting gas.

EXAMPLE 1

| Temperatures: | Stage I, top | °C | 190 – 200 | |
| --- | --- | --- | --- | --- |
| | Stage II, bottom | °C | 235 – 240 | |
| | Product temp. | °C | 220 | |
| Charging: | Wet acid | kg/h | 4.08 | |
| | Ammonia | kg/h | 0.76 | |
| | Molar ratio $NH_3 : P_2O_5$ | | 5.4 | |

Analysis of discharged product: 14.3% $NH_3$-N, 54.5% total $P_2O_5$, of which 38.9% was polyphosphoric acid.

EXAMPLES 2 AND 3

| Temperatures: | Stage I, top | °C | 190 – 200 | |
| --- | --- | --- | --- | --- |
| | Stage II, bottom | °C | 240 – 250 | |
| Charging: | Wet acid | kg/h | 1.9 | 2.72 |
| | Ammonia | kg/h | 0.26 | 0.37 |
| | Molar ratio $NH_3 : P_2O_5$ | | ~3.95 | ~3.95 |
| The following values meantime established themselves: | | | | |
| | Product temperature in °C | | 220 | 230–240 |
| | Product pH | | 4.5–4.6 | 4.5–4.6 |
| Composition: | | | | |
| | $NH_3$-N | wt-% | About 14 | About 14 |
| | Total $P_2O_5$ | wt-% | About 57 | About 57 |
| of which | Polyphosphoric acid | % | 75 | 70 |

With a larger charge per time in the falling film reactor under otherwise the same conditions the product temperature, as shown by Examples 2 and 3, rises from 220° C to 230°–240° C. The composition and the pH values of the reaction products, however, remain virtually unchanged, but the degree of condensation diminishes (due to the shorter reaction time) in the case of the larger charge, from 75 to 70%, for example.

Whereas according to these two examples the increasing input to the apparatus only reduces the degree of condensation when the $NH_3:P_2O_5$ ratio remains constant, a variation of this ratio will produce great changes. Thus, according to further examples, when the feeding rate was 0.76 kg of ammonia per hour and 2.17 to 2.44 kg of wet acid per hour (corresponding to an $NH_3:P_2O_5$ molar ratio of 9.6) pH values of approximately 5 were obtained. On the other hand, at 0.76 kg of ammonia per hour and 2.76 to 2.99 kg [of wet acid] per hour (corresponding to a molar ratio of 7.7), pH values of 3 were obtained.

No disturbances were caused in the experimental runs by solid impurities.

What is claimed is:

1. A process for the continuous preparation of ammonium polyphosphate which comprises:
  A. Continuously passing crude or pure wet process phosphoric acid containing solids having a phosphoric acid concentration, calculated as $P_2O_5$, of 28 to 32 weight percent, in the form of a falling film downwardly within at least one fall tube of a falling film reactor;
  B. Continuously evaporating water from said wet process phosphoric acid or the resultant polyphosphate solution and continuously condensing phosphate therein to form polyphosphate while;
  C. Continuously introducing gaseous ammonia upwardly through said fall tube in counter-current flow to the downwardly falling film of crude wet process phosphoric acid, the ammonia being present in a molar excess such as to form a product whose $NH_3:P_2O_5$ is between 0.5 and 4.5:1;
  D. Continuously maintaining the temperature in the fall tube reaction zone in the range of 120° to 260° C such that the temperature is higher at the lower region of the fall tube than it is thereabove; and
  E. Continuously adjusting the pH of the resultant ammonium phosphate solution by evaporation of water therefrom so that an aqueous solution containing 10% by weight sample has a pH between 2.5 and 6.0, said evaporation being affected employing the heat of neutralization generated by the reaction of the crude wet process phosphoric acid with the gaseous ammonia.

2. Process of claim 1 wherein the temperature in the falling film reaction zone is adjusted by heat transfer fluids.

3. Process of claim 1 wherein air or nitrogen is used as the inert diluting gas in step C.

4. Process of claim 1 wherein urea or other compounds favoring polycondensation are added to the aqueous phosphoric acid fed to the reaction zone.

5. Process of claim 1 wherein the molar ratio of $NH_3$ to $P_2O_5$ is between 1.93 and 2.84:1.

6. Process of claim 1 wherein water vapors released in the reaction zone of one or more stages of a multiple stage reaction zone is condensed between stages and the remaining ammonia with the diluting gas, when present, is returned to the next stage of the falling film reaction zone after being heated to the temperature of said next stage.

7. Process of claim 1 wherein the ammonia, the diluting gas, when present, and the acid are preheated using the heat transfer fluids.

8. Process of claim 1 wherein vapors emerging from the falling film reaction zone are freed of residual ammonia and fluorine compounds in separators, such as injection condensers, the ammonia preferably being recycled to the reaction zone and the fluorine compounds isolated as by-products.

9. Process of claim 1 wherein the supply of ammonia and of phosphoric acid, the heating temperatures in the different stages and the water vapor condensation in the different condensing circuits are regulated such that products are formed such that the molar ratio of ammonia to $P_2O_5$ of the resultant product is 1.74–3.00:1.

10. Process of claim 9 wherein a molten mass is produced containing 14 ± 2 weight percent ammonium nitrogen and 60 ± 3 weight percent $P_2O_5$ with contents of polyphosphoric acid between 25 and 85%.

* * * * *